No. 887,232.
PATENTED MAY 12, 1908.
J. H. CROWSON.
FISH TRAP.
APPLICATION FILED JULY 6, 1907.
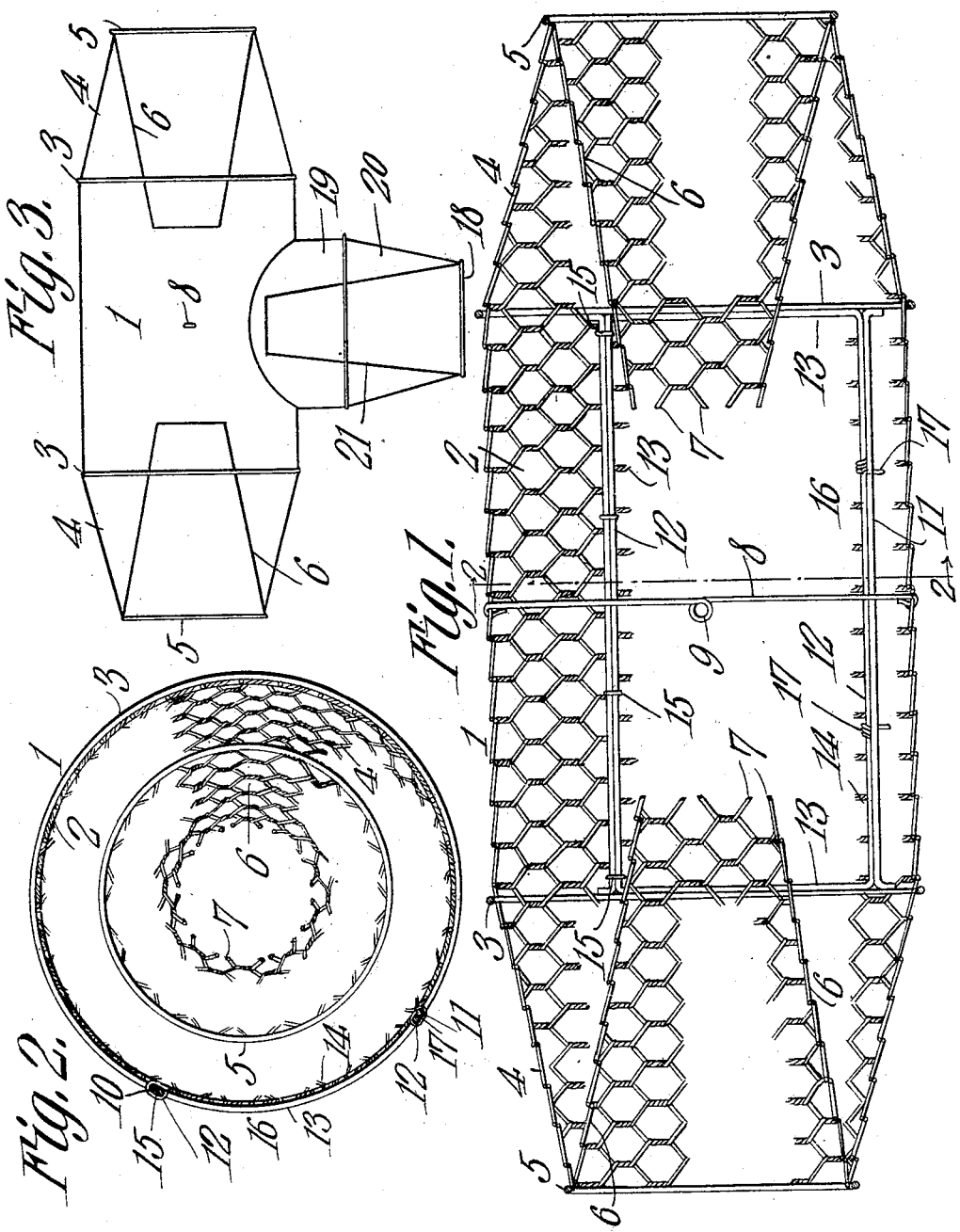
WITNESSES:
Jonas H. Crowson INVENTOR
By C. A. Snow & Co.
ATTORNEYS

UNITED STATES PATENT OFFICE.

JONAS HENRY CROWSON, OF ATLANTA, TEXAS.

FISH-TRAP.

No. 887,232.  Specification of Letters Patent.  Patented May 12, 1908.

Application filed July 6, 1907. Serial No. 382,506.

*To all whom it may concern:*

Be it known that I, JONAS HENRY CROWSON, a citizen of the United States, residing at Atlanta, in the county of Cass and State of Texas, have invented a new and useful Fish-Trap, of which the following is a specification.

This invention relates to a trap primarily intended for catching fish, but which may be used with equal facility for capturing raccoon, mink, birds and rodents of various kinds, such as rats, squirrels, rabbits etcetera.

The invention consists substantially of a cylindrical body with a plurality of necks, slightly tapering, projecting from said body. Attached to each neck at its outer end or mouth is a frusto conical inlet guide directed inwardly from the mouths through the necks into the body. These inlet guides are intended to permit the entrance of fish and other game, but prevent such from making its escape. A bait support is placed centrally of the trap, and a door or closure is provided for removing the trapped game.

With this and other objects in view the invention consists of certain novel combination, construction and arrangement of parts hereinafter described and definitely claimed.

Referring to the accompanying drawings: Figure 1 is a central longitudinal section through the improved trap. Fig. 2 is a cross sectional view of the same on the line 2—2 of Fig. 1. Fig. 3 is a diagram illustrating a modified form of the trap.

Similar reference numerals are used on all the figures for designating the same parts.

The cylindrical body of the trap is indicated by the numeral 1 and it will be of such dimensions as to length and diameter as necessitated by the use to which it will be put, or the capacity of the trap demands. The body of the trap is made preferably of some non-corrosive metal netting 2, as galvanized wire such as is commonly used for fencing purposes. This netting is rolled into a cylinder and held in shape by a ring 3 made of stout wire or rod metal at each end of the body 1 and fastened thereto in a permanent manner. Extending outwardly from each end of the body is a neck 4 attached to the rings 3 as a separate piece of netting, or made from a continuation at each end of the body netting 2 in a manner well understood. The projection of the necks 4 is about equal to the diameter of the body 1 and as they have a slight taper, their outer or inlet ends are of less diameter than the trap and are held in circular shape by stout hoops 5 fastened to the mouths of the neck 4.

Attached to each hoop 5 and extending inwardly through the necks 4 and a short distance into the body 1 is a frusto conical inlet guide 6, smaller at its inner than at its outer end and provided on said inner end with a plurality of points 7 projecting towards the center of the trap. Extending diametrically across the center of the body 1 is a bait wire 8 having an eye 9 formed at its middle for the attachment of bait.

The captured fish or game are removed from the trap by means of a door attached to the body in any desired or convenient way. In the drawing one form of door is shown in Figs. 1 and 2 and as there constructed, it comprises two parallel rods 10 and 11 separated a proper distance to form the door opening and firmly fastened to the rings 3 at the ends of the body. A section of netting is cut out to leave the space between the parallel rods open, the cut ends of the netting being secured to the rings 3 and the parallel wires 10 and 11. Fitted in the open space thus formed is a rectangular frame 12, the end bars 13 of which are curved to the same radius as the rings 3 to retain the same regular shape as the rest of the body. The frame 12 is filled with a piece of netting 14 similar to that on the body. Hinges 15 of any suitable type may be used to secure the door 16 to one of the parallel bars 10 or 11 and spring latches 17 fastened to the opposite side of the door to engage the other bar and hold the door closed.

It is sometimes desirable to have more than two inlet openings to a trap of this type, which change may be readily accomplished in the manner shown in Fig. 3 where a third inlet 18 is shown attached to a projecting cylindrical portion 19 on the side of the body having at its end a neck 20 and a frusto-conical guide 21 similar to those at the ends of the body 1.

For catching fish the trap is baited, the door closed and the trap lowered into the water. Fish attracted by the bait will enter the trap through the frusto conical guides and be prevented from making their exit in the same way by the points 7 which project toward them.

Having thus described the invention, what is claimed is:

A fish trap comprising a body made of netting bent into cylindrical form, the edges of said netting on the sides of the body being separated, a stiff ring at each end of said body to which the netting is secured, two spaced rods extending from one ring to the other at the side of the body to which said edges of the netting are attached, a door hinged to one of said rods and provided with fastening means to engage the other rod, a tapering neck irremovably fastened to each ring and extending outwardly, a ring secured to the outer end of each neck, a frusto-conical guide fixed to each of the last named rings projecting into the neck, and a bait holder extending diametrically across the center of the trap.

In testimony that I claim the foregoing as my own, I have hereto affixed my signature in the presence of two witnesses.

JONAS HENRY CROWSON.

Witnesses:
B. A. NEVILLE,
H. P. PHIPPS.